(12) United States Patent
Vajda et al.

(10) Patent No.: US 11,028,490 B2
(45) Date of Patent: Jun. 8, 2021

(54) SUBNANOMETER CATALYTIC CLUSTERS FOR WATER SPLITTING, METHOD FOR SPLITTING WATER USING SUBNANOMETER CATALYST CLUSTERS

(71) Applicant: UCHICAGO ARGONNE, LLC, Chicago, IL (US)

(72) Inventors: Stefan Vajda, Lisle, IL (US); Larry A. Curtiss, Downers Grove, IL (US); Michael J. Pellin, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 200 days.

(21) Appl. No.: 16/043,322

(22) Filed: Jul. 24, 2018

(65) Prior Publication Data

US 2019/0017182 A1 Jan. 17, 2019

Related U.S. Application Data

(63) Continuation of application No. 13/862,116, filed on Apr. 12, 2013, now abandoned.

(51) Int. Cl.
| | |
|---|---|
| *C25B 11/02* | (2021.01) |
| *C25B 1/04* | (2021.01) |
| *C25B 3/25* | (2021.01) |
| *C25B 11/051* | (2021.01) |
| *C25B 11/059* | (2021.01) |
| *C25B 11/069* | (2021.01) |
| *C25B 11/077* | (2021.01) |
| *C25B 11/081* | (2021.01) |
| *C25B 11/091* | (2021.01) |

(52) U.S. Cl.
CPC .............. *C25B 11/02* (2013.01); *C25B 1/04* (2013.01); *C25B 3/25* (2021.01); *C25B 11/051* (2021.01); *C25B 11/059* (2021.01); *C25B 11/069* (2021.01); *C25B 11/077* (2021.01); *C25B 11/081* (2021.01); *C25B 11/091* (2021.01); *Y02E 60/36* (2013.01)

(58) Field of Classification Search
CPC ..................... C25B 11/0473; C25B 1/02–10
See application file for complete search history.

(56) References Cited

U.S. PATENT DOCUMENTS

| | | | |
|---|---|---|---|
| 7,582,586 | B2 | 9/2009 | Fanson |
| 7,713,907 | B2 | 5/2010 | Elam |

(Continued)

OTHER PUBLICATIONS

Lee et al. (Journal of Physical Chemistry C, 114, 2010, pp. 10342-10348, http://pubs.acs.org/doi/abs/10.1021/jp91222ow?source=chemport).

(Continued)

*Primary Examiner* — Nicholas A Smith
(74) *Attorney, Agent, or Firm* — Cherskov Flaynik & Gurda, LLC (57) ABSTRACT

The invention provides a catalytic electrode for converting molecules, the electrode comprising a predetermined number of single catalytic sites supported on a substrate. Also provided is a method for oxidizing water comprising contacting the water with size selected catalyst clusters. The invention also provides a method for reducing an oxidized moiety, the method comprising contacting the moiety with size selected catalyst clusters at a predetermined voltage potential.

11 Claims, 4 Drawing Sheets

(56) References Cited

U.S. PATENT DOCUMENTS

| | | | |
|---|---|---|---|
| 8,143,189 | B2 | 3/2012 | Vajda |
| 8,148,293 | B2 | 4/2012 | Vajda |
| 2007/0227896 | A1 | 10/2007 | McNulty |
| 2008/0260607 | A1 | 10/2008 | Flytzani-Stephanopooulos |
| 2009/0134029 | A1 | 5/2009 | Tanahashi |
| 2009/0233790 | A1 | 9/2009 | Vajda |
| 2013/0034489 | A1 | 2/2013 | Gilliam |
| 2014/0349203 | A1* | 11/2014 | Klose-Schubert .... H01M 4/925 429/418 |
| 2015/0191834 | A1* | 7/2015 | Patru ........................ C25B 11/04 205/630 |

OTHER PUBLICATIONS

Engelmann et al. (Journal of Electrochemical Society, vol. 145, No. 3, 1998, pp. L33-L35, http://jes.ecsdl.org/content/145/3/L33.full.pdf+html).

Kacprzak et al (Physical Chemistry Chemical Physics, 2012, 14, 10243-10247).

Sessi et al (Physical Review B, 81, 2010, pp. 195403-1 to 195403-12, http://journals.aps.org/prb/pdf/1 0.11 03/PhysRevB.81.195403).

Howard et al (Surface Science, 515, 2002, pp. L504-L508, http://ac.els-cdn.com/S0039602802020034/1-s2.0-S0039602802020034-main.pdf? tid=043a6c20-6129-11 e5-903d-00000aacb360&acdnat= 1442926629_9bec43370692ea7e673b68eea49bf464).

Zhao et al (Journal of Natural Gas Chemistry, 21,2012, pp. 544-555, http://ac.els-cdn.com/S1003995311604039/1-s2.0-S1 003995311604039-main.pdf? tid=f76d7e88-6128-11 e5-894f-00000aacb362&acdnat= 1442926608_ 13d5ea06fefccbbd57fb392b56a096db).

Ferguson et al (Journal of Physical Chemistry C, 2012, 116 (45), pp. 24027-24034, http://pubs.acs.org/doi/pdf/10.1 021 /jp3041956).

Berr et al. (Nano Letters, 2012, 12, pp. 5903-5906).

Vajda et al. (Nature Materials, vol. 8, 2009, pp. 213-216).

\* cited by examiner

Table 1. Per Pd cluster and per Pd atom turnover rates at 1.626 V vs RHE (η = 351 mV).

| Cluster | TOR / Pd$_n$ TOR per cluster (this work) [1 × cluster$^{-1}$ s$^{-1}$] | TOR / Pd TOR per total atom (this work) [1 × atom$^{-1}$ s$^{-1}$] | TOR / surface Pd atom (based on ref. 7) (surface of bulk Pd) [1 × atom$^{-1}$ s$^{-1}$] | TOR / surface Co atom (based on ref. 7) (CoOx on Au surface) [1 × atom$^{-1}$ s$^{-1}$] |
|---|---|---|---|---|
| Pd$_4$ | −0.15 | −0.038 | 0.024 | 1.24 |
| Pd$_6$ | 4.03 | 0.68 | | |
| Pd$_{17}$ | 10.17 | 0.60 | | |

SUBNANOMETER CATALYTIC CLUSTERS FOR WATER SPLITTING, METHOD FOR SPLITTING WATER USING SUBNANOMETER CATALYST CLUSTERS

PRIORITY CLAIM

This Utility Patent Application Claims priority benefit as a continuation of U.S. Non-Provisional application Ser. No. 13/862,116, filed on Apr. 12, 2013, presently pending, the entirety of which is incorporated by reference herein.

CONTRACTUAL ORIGIN OF THE INVENTION

The United States Government has rights in this invention pursuant to Contract No DE-AC02-06CH11357 between the United States Government and UChicago Argonne, LLC representing Argonne National Laboratory.

BACKGROUND OF THE INVENTION

1. Field of the Invention

This invention relates to an electrode and a method for facilitating electrochemical reactions, and more specifically this invention relates to an electrode and a method for utilizing size selected catalyst clusters to facilitate oxidizing and reducing reactions.

2. Background of the Invention

Efficient methods for splitting water are a key scientific challenge for meeting the world's fuels needs over the next century. Water oxidation (i.e., water splitting) is a key catalytic step for electrical fuels generation. It consists of two reactions: the hydrogen evolution reaction (HER) and the oxygen evolution reaction (OER).

Oxygen evolution reactions (see Equations 1 and 2 infra) require high over potentials ($\eta$=0.3~0.5 V depending on the catalytic material and support chosen). The overpotential, $\eta$, is the potential required above the standard reaction potential (1.23 V at pH=0). As such, the overpotential required often results in undesirable effects such as higher use of energy, degradation of catalyst, and reduction of support structures.

Even when the reaction occurs, turnover rates (the number of water molecules converted per atom of catalyst metal) remain low. This critical step occurs in acid via the reaction:

$$2H_2O \rightarrow 4H^+ + 4e^- + O_2 \quad \text{Equation 1}$$

and in base via the reaction:

$$4OH^- \rightarrow 2H_2O + 4e^- + O_2 \quad \text{Equation 2}$$

In a fuel cell, where the inverse acid OER reaction, Equation 1, is employed to produce energy, this poor catalytic performance results in the need for a high Pt catalyst loading on the cathode. This adds significantly to the cost of electrodes.

In electrolyzers, reaction in base is often employed to improve catalytic performance. However, additional effort is necessary to identify more efficient, less expensive electrocatalysts for the OER reaction.

The complexity of both the catalytic materials and the water oxidation reaction makes understanding the catalytic site critical to improving the process.

State of the art catalyst systems comprise films and macroscale particles as catalytic surfaces. It was commonly believed that these macro-sized morphologies were required to withstand the harsh reaction conditions (extreme pH, temperatures, pressures) associated with oxidation and reduction protocols. However, these materials are ill-defined in their structure and especially their composition. Typically, high metal/metal oxide loadings are utilized. This results in only a very small fraction of atoms on the surface actually participating in the reaction, while the bulk of materials beneath the surface do not participate.

Given the large size (more than 5 nanometers) of the catalyst particles utilized in the state of the art, the composition and size of the active site is unknown. Many of these large size systems comprise platinum or other precious metals. Therefore, a rational optimization of the electrocatalyst has remained elusive, while also remaining very expensive.

State of the art catalysts also suffer from instability in that they change in size, composition and/or morphology. This can negatively impact their function and therefore the efficiency of conversions. Lastly, catalytic systems suffer from degradation of the support material, partially due to its own undesirable reactivity. For example, oxide supports, and the most common supports comprising amorphous carbon and other forms of carbon, may have more defects (such as unfavorable reaction sites) than graphite or diamond supports, but also may be relatively less expensive.

In light of the foregoing, most state of the art electrocatalysts are neither efficient nor specific enough to be used on a large scale economically.

A need exists in the art for a catalyst system and a method for catalysis that is applicable to many reactions, including water electrolysis. The system and method should either completely eliminate, or minimize the use of precious metals. The system and method should also be self-healing so as to extend the longevity of the system, and thereby enhance the efficiency and economics of catalysis processes. And the system and method should incorporate catalytic materials having reduced over potentials and increased turnover rates.

SUMMARY OF INVENTION

An object of the invention is to provide a water splitting system that overcomes many of the drawbacks of the prior art.

Another object of the present invention is to provide electrocatalysts for water decomposition. A feature of the invention is the use of clusters of catalysts, wherein each of the clusters contain no more than about 50 atoms of catalytic moiety, preferably between 3 and 50 atoms and more preferably between 4 and 30 atoms. An advantage of the invention is achieving the highest utilization of catalyst, thereby rendering the electrocatalysts very economical to use.

Still another object of the present invention is providing a method for electro-oxidation or electro-reduction reactions. A feature of the method is subjecting a fluid containing the moiety to be converted water with catalyst comprising non-precious and precious metal clusters supported on an electrically conductive support wherein the clusters cover between 1 and 25 percent of the surface of the support and each of the clusters comprise a predetermined number of atoms. (An embodiment of the invention comprises clusters covering between 1 and 5 percent of the surface of one side of the support.) An advantage of the method is that it provides a very efficient catalytic method wherein target moiety conversions per catalyst cluster surface atom is between about 10 and 100 times higher than conversion rates seen in state of the art films and catalytic nanoparticles larger than 1 nanometer. This results in a cost that is relatively low compared to methods using precious metals.

Yet another object of the present invention is providing a self-healing catalyst system. A feature of the invention is the use of some sized metal catalytic clusters (such as clusters consisting of 4-50 metal atoms of catalytic material) to eliminate support structure defects by covering them, (i.e. isolating them from direct exposure to the environment) and therefore passivating them. An advantage of the invention and the use of relatively higher atom containing clusters on the same passivated support to enable catalytic reactions. This enhances the activity of the catalyst while extending the useful lifetime of the entire electrode.

Briefly, the invention provides a catalytic electrode for converting molecules, the electrode comprising a predetermined number of single catalytic sites supported on a substrate.

Also provided is a method for oxidizing water comprising contacting the water with size selected catalyst clusters.

The invention also provides a method for reducing an oxidized moiety, the method comprising contacting the moiety with size selected catalyst clusters at a predetermined voltage potential. In an embodiment of the invention, the voltages applied in the method range from between approximately −2 V and +2.5 V with respect to the standard hydrogen electrode. This voltage range enables electrolysis related to oxygen evolution, hydrogen evolution and $CO_2$ reduction, and also high temperature electrolysis protocols as also described herein.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Water splitting is a key step to develop processes for energy/fuel production that is independent of fossil fuels. In an embodiment of the invention, the invented subnanometer catalyst system offers energy efficient three dimensional electrocatalysts with tailorable performance and at the highest possible level of usage of catalytic metals (i.e., the most efficient use). Such three dimensional systems comprise clusters containing more than three atoms of reactive moiety. The system is operable in very harsh environmental conditions (e.g., in alkaline conditions, typically above 10 pH, and often higher than 13 pH). For example, in an embodiment of the invention, electrochemical conditions of pH 13.1 at 1.8 V vs. a reference hydrogen electrode (RHE) were accommodated.

Figure 3:
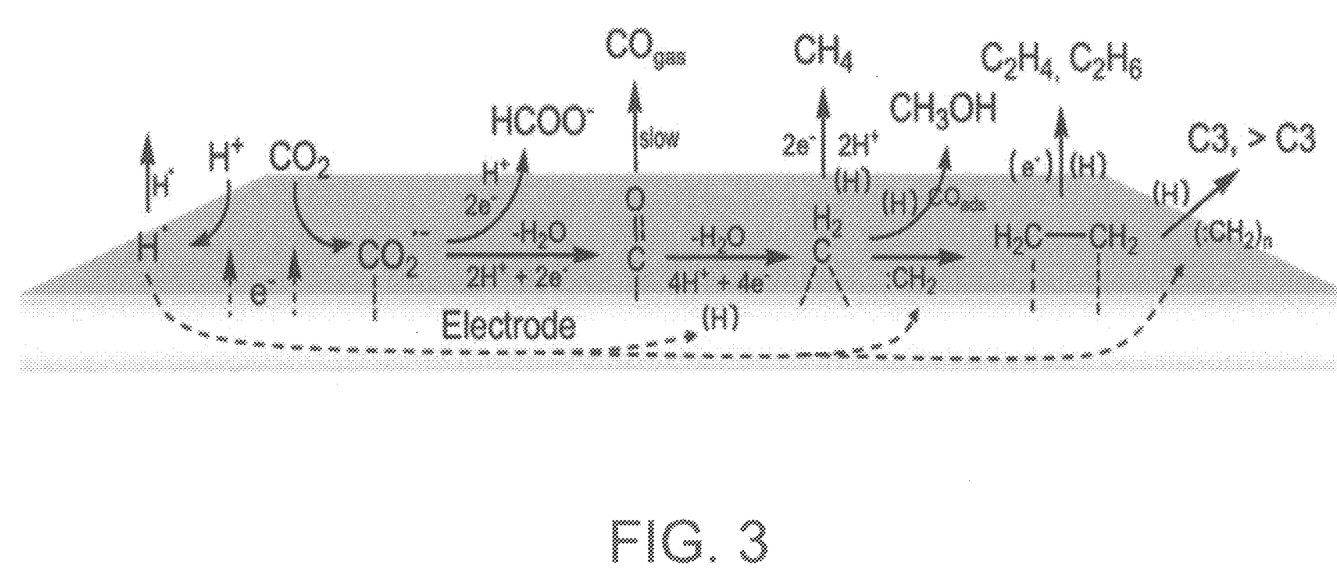
FIG. 3 is a schematic of CO2 reduction, in accordance with features of the present invention.

Aside from facilitating oxidation in harsh environs, the system also is applicable in reduction scenarios, for example in the reduction of carbon dioxide via the schematic depicted in FIG. 3. In this scenario, water splitting is combined with $CO_2$ conversion to produce fuels and or other valuable feedstocks (e.g. $C_xH_y$ and $C_xH_yR_z$ wherein R is an inorganic or an organic (e.g., alky, allyl) moiety and x, y and z represent molar ratios), as well as oxygenated products.

The invented system is applicable at a myriad of temperatures ranging from 5 to 900° C. For example, when liquid water is oxidized, any temperature below 100° C. is suitable. However, if waste water, contaminated water, pressurized water, or pressurized steam is being treated, (such as what may occur in turbine applications), conversions occurring at above 100° C., and as high as 900° C. are envisioned. However, typical "high" temperatures are between about 100-350° C.

A pH range of from about 2 to 13, and pressures up to 15 atmospheres are accommodated by the invention. Preferred pressures are up to about seven atmospheres.

The invention provides subnanometer (e.g., between approximately 0.2 nm and 0.9 nm) electrocatalyst materials for oxidation/reduction of fluids such as water, carbon dioxide, organics (including contaminants in water) and combinations of fluids. All of the catalytic clusters on a support can consist of a single metal, or alternatively, several different metals. Suitable metals include, but are not limited to Co, Ni, Pd, Pt, Ir, Ag, Al, Ru, Fe, their alloys and combinations of these metals and alloys. In an embodiment of the invention, some of the catalytic sites comprise a first moiety, and some of the catalytic sites comprise a second moiety, whereby the moieties are metals and or metal oxides.

Cluster interaction with the support can be covalent, noncovalent, ionic or combinations thereof. Detail of the interaction and attachment of Co clusters to substrate are disclosed by the inventors in *Journal Physical. Chemistry*, 2012, 116, pp 24027-24034, the entirety of which is incorporated herein by reference.

The clusters are supported on electrically conducting substrate, including but not limited to, various (i) carbon based materials, such as (ultra)nanocrystalline diamond, graphite, graphene, carbon nanotubes and other; (ii) oxides such as alumina, iron oxide, copper oxide, titania, magnesium oxide, zinc oxide, zirconium oxide, hafnium oxide, tungsten oxide (iii) metals such as copper, silver, aluminum, tantalum, tungsten and combinations thereof.

UNCD is particularly suitable for use in harsh experimental conditions and demonstrates a very wide potential electrochemical working window of about 3.5 V while displaying only minor reactivity. The activity of the support is approximately one to two orders of magnitude lower than that of the clusters (depending on the support composition and cluster size/composition).

The instant system offers splitting systems that are lower in cost and have higher efficiency than state of the art electrolysis systems.

An embodiment of the invention provides a method for oxidizing water in alkaline conditions using size-selected clusters (between approximately 0.2 nm and 0.9 nm) of Co, Ni, Pd, Ir, Ag, Al, their oxides and other metals and their oxides. An exemplary catalyst system comprises three-dimensional clusters such as those clusters containing more than 3 atoms. For example, 6-atom clusters, and 17-atom clusters of palladium supported on an electrically-conducting surface such as alumina and UNCD provide good catalytic results, while for example smaller Pd clusters are also active on $TiO_2$ and/or ZnO supports.

This demonstrates that specific bonds in the cluster/catalytic active site, such as bridging Pd—Pd sites are active for the Oxygen Evolution Reaction (OER) depicted in Equation 1, supra, while in general, the size of the working catalyst may vary with support and the reaction being pursued. The catalytic activity of the clusters is based on the turnover rate per Pd atom.

Notwithstanding the foregoing, the invented system and method for catalysis is also applicable for use in acidic conditions. Such conditions may be applicable in electrochemical water splitting incorporating catalytic reduction scenarios. In these instances, the invented cluster/support composites are tolerant of pHs from between approximately 3 to 13.

Electrode Detail

Figure 4:
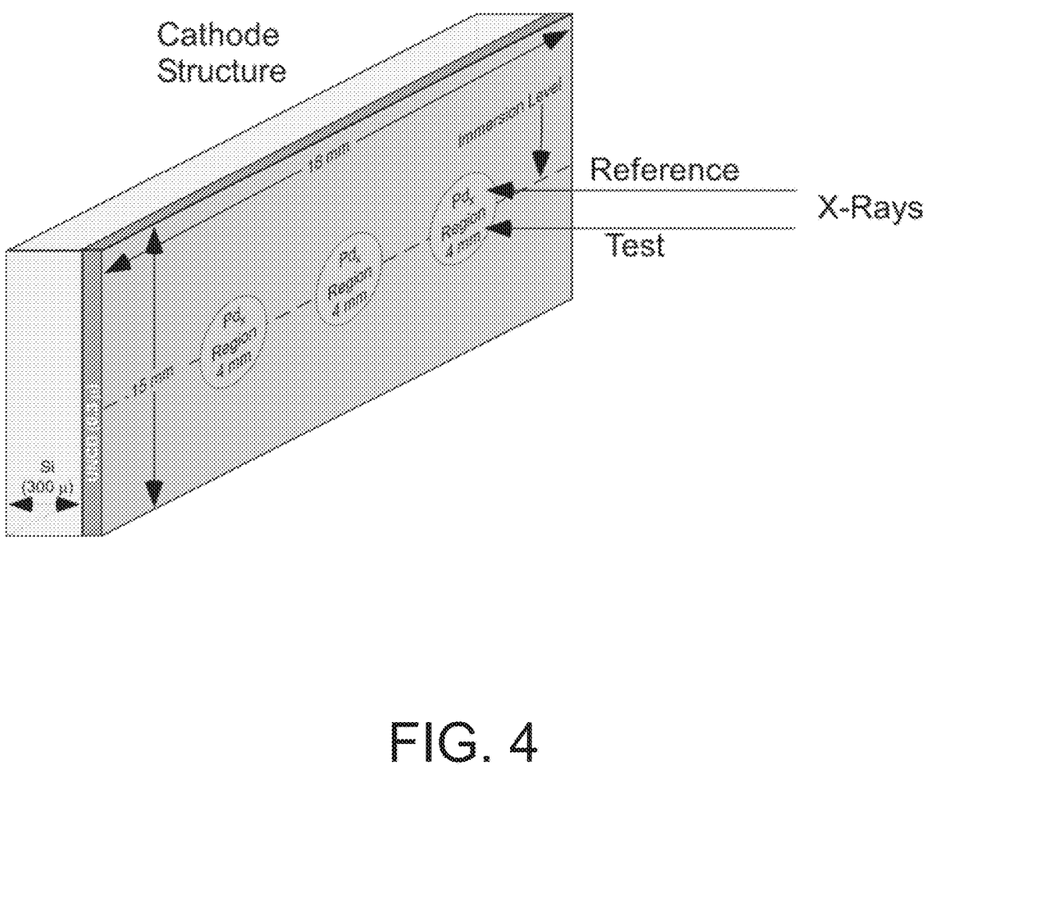
FIG. 4 is a schematic of a cathode, in accordance with features of the present invention.

FIG. 4 is a schematic diagram of exemplary cathodes used in experiments by the inventors. An embodiment of the cathode comprises a UNCD coated Si wafer with three soft-landed (4 mm diameter) regions of clusters. A separate cathode was prepared for each Pd cluster size (Pd4, Pd6, or Pd17).

Schematics of the cluster-covered area on the sample immersed into the electrolyte showing three cluster spots of ~4 mm in diameter. The arrows below and above the central immersion line indicate the incident X-ray beams which, in addition to the determination of cluster area and position, were used to characterize by GISAXS and GIXANES the potential differences in particle size and oxidation state of the unimmersed (as deposited) and in electrolyte immersed exposed clusters, respectively.

Cluster support can either be a homogeneous material, such as free standing substrate, or a heterogeneous construction wherein an electrically conductive material such as metal or UNCD overlays a rigid foundation. The cathode structure depicted in FIG. 4 depicts a heterogeneously constructed cathode. Generally, the support substrate is an electrically conductive material and/or a 1-100 nm thick coating overlaying the material, whereby the material or the coating is selected from the group consisting of various (i) carbon based materials, such as (ultra)nanocrystalline diamond, graphite, graphene, carbon nanotubes and other; (ii) oxides such as alumina, iron oxide, copper oxide, titania, magnesium oxide, zinc oxide, zirconium oxide, hafnium oxide, tungsten oxide (iii) metals such as copper, silver, aluminum, tantalum, tungsten and combinations thereof.

In an embodiment of such a construction, silicon wafers coated with a 0.3µ thick ultrananocrystalline diamond film purchased from Advanced Diamond Technologies (UA25-100-0-p3) were used as the support electrodes. All electrodes used in this study were constructed from 15×18 mm size chips diced from the same wafer. Dicing for example can be accomplished by scoring and breaking the wafer or by using precision laser cutting. The latter allows precision sample sizes.

UNCD is a preferred support material with a wide, flat potential window showing excellent stability under the harsh electrochemical oxidation conditions. The surface roughness of the wafers was ~7 nm RMS and the electrical conductivity of the B-doped Silicon wafer/UNCD film combination of ~1 ohm-cm was sufficient to both allow controlled "soft-landing" of size-selected Pd clusters and to allow electrochemical studies. The wafers were used as purchased except for the dicing operation and for solvent cleaning prior to size-selected cluster deposition.

Cluster Deposition Detail

A myriad of methods for producing the clusters are utilized, including those disclosed in the inventor's previous patents (U.S. Pat. Nos. 8,143,189 and 8,148,293) both of which are incorporated herein by reference in their entirety. Cluster-based catalysts were prepared by depositing a narrow size-distribution of clusters generated in a laser vaporization cluster source. A myriad of metals are suitable as cluster constituents. Other cluster sources, such as magnetron, cold discharge, electrospray, microplasma, microwave or atomic layer deposition, chemical vapor deposition, decomposition of organometallic and other precursors by photons, small clusters produced in solution can be envisioned to produce the clusters. For the purposes of illustration only, palladium metal is discussed in this section, with the palladium clusters produced in a laser vaporization source.

A molecular beam of palladium clusters was generated by laser vaporization of a rotating palladium target using helium as a buffer gas. This continuous cluster beam was guided through ion optics and a quadrupole assembly. This assembly could be tuned to select clusters of a single nuclearity. Then mass-selected, positively charged clusters were directed onto the UNCD coated Si wafer support. For the three cluster sizes chosen here Pd4, Pd6, and Pd17,) the size distribution was 1, 2 and 3 atoms, respectively, around the main size (i.e. 4+/−1, 6+/−2 and 17+/−3 atoms per cluster). The kinetic energy of the clusters was controlled by electrical potentials placed on the wafer. This "soft-landing" method allowed deposition without subsequent agglomeration.

The amount of deposited palladium metal was determined by real-time monitoring of the deposition flux on the support. The total charge deposited could be determined with less than 5% uncertainty of the targeted surface coverage. In order to avoid possible aggregation of clusters on the surface, the surface coverage was chosen to be around 0.1 atomic ML equivalent of palladium metal for all samples, based on $1.53 \times 10^{15}$ atoms/cm2 of a Pd (111) plane. Three spots were deposited on each sample with size-selected clusters (see FIG. 4).

The position and diameter of the cluster-covered area was later determined by GIXAS at 12-ID-C beamline of the Advanced Photon Source (Argonne Laboratory, Argonne Ill.), with an estimated uncertainty of 0.5 mm or better. The diameters of the cluster spots (each cluster spot which in turn is comprised of approximately $10^{12}$ to $10^{14}$ clusters/cm$^2$, depending on cluster size, each cluster physically isolated from each other) varied between 4 and 5 mm, depending on cluster size and deposition conditions.

The inventors found that these clusters withstand the harsh reaction conditions embodied in the oxidation and reduction protocols discussed herein. These results were unexpected as the electrocatalytic community's perception was that only larger, nm sized (i.e. at least 1 nm), particles can survive such conditions.

Surprisingly and unexpectedly, the inventors have discovered that overpotential and turnover frequency can be predicted can be determined based on the size of the cluster utilized. The number of catalytic sites (number of deposited metal atoms as well as number of clusters) is determined from the inventor's synthesis method.

The per electron turn-over rate was calculated as follows: i) converting current into charge/sec (Coulomb's law), ii) dividing the charge/sec by the number of deposited atoms gives the number of electrons turned over by a single catalytic moiety such as a Pd atom. As producing an O2 molecule takes 4 electrons, dividing the electron turn-over numbers gives the produced turn-over number (TOR) for O2. Lastly, the per cluster turn over rates are calculated by dividing the preceding O2 TOR with the number of the atoms in the given sample (i.e., 4, 6 or 17).

Soft-landed Pd4, Pd6 and/or Pd17 clusters on an UNCD Silicon-coated electrode shows stable electrochemical potentials over several cycles. Soft landings are effected when a voltage potential exists between free associated clusters and support of between about 1 V and 17 V. Generally, suitable voltages are those above which the clusters would otherwise decompose or dissolve into solution. However, high voltages (about several tens or hundreds of V) may result in heavy impingement of the cluster to the support surface, leading to possible defects and embedment of the cluster into the support system. While some support surfaces (e.g., those comprised of graphite) are amenable to such embedment, others may not be and defects or chinks in the surfaces often result. The inventors have discovered that a soft landing with low atom number clusters (e.g. 4 atoms) ameliorates any defects existing or otherwise produced in the support surfaces. Synchrotron studies of the electrodes show no evidence for evolution or dissolution of either the electrode material or the clusters nor their aggregation into larger, nanosized entities, as judged from high sensitivity X-ray absorption and scattering experiments.

Subnanometer cobalt oxides with CoO-type oxidation states are highly active and stable on various supports, those supports including, but not limited to UNCD, graphite, graphene, carbon nanotubes, iron oxide, titanium oxide, zinc oxide, zirconium oxide, magnesium oxide, hafnium oxide and combinations thereof, including supports made of nano-sized particulates or nanoshapes made of these materials and/or nanopatterned by physical or chemical methods.

The inventors have discovered that the overpotential and turnover frequency are cluster-size dependent (i.e., are dependent on the number of atoms comprising each cluster). This discovery was made given the capability of the method disclosed herein to formulate catalysts comprising single catalytic sites, and the method to measure the number of such sites on the support electrodes.

Example 1

Figure 1A:
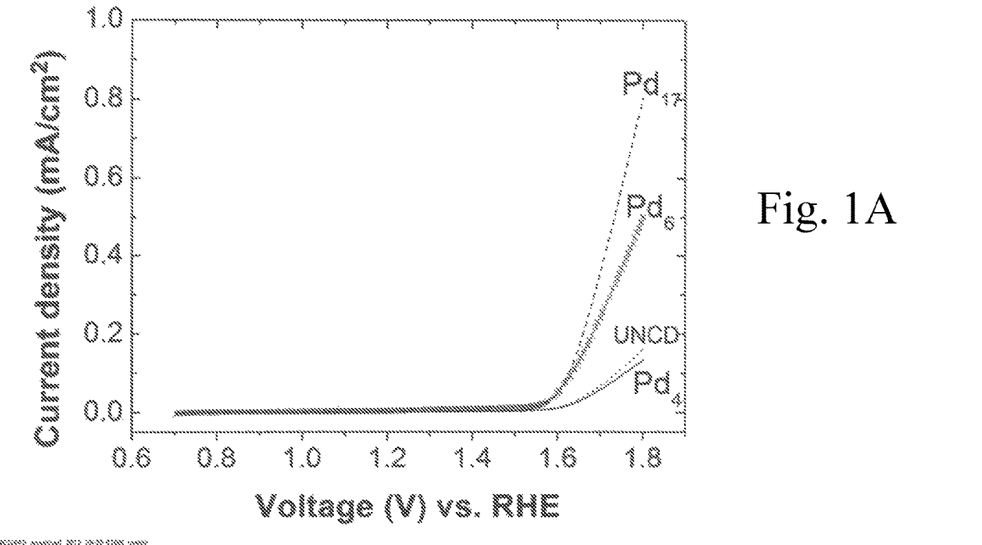
FIGS. 1A and 1B are graphs showing performance of electrodes with different sized catalytic clusters, in accordance with features of the present invention.

OER activity was measured for three Pd clusters (Pd4, Pd6 and Pd17). The activity was measured on an ultrananocrystalline diamond film electrode at pH 13.6 (1M NaOH). FIG. 1a shows linear sweep voltammetry (LSV) curves of Pd4 (solid line), Pd6 (cross-hatched line) and Pd17 (dashed line) clusters after 500 second cleaning/preconditioning by chronoamperometry at about 1.7 V. A background curve (dotted line) for a UNCD coated electrode without deposited Pd clusters is also shown. The blank UNCD used was of the same dimensions and identical batch as the cluster-covered samples.

Figure 1B:
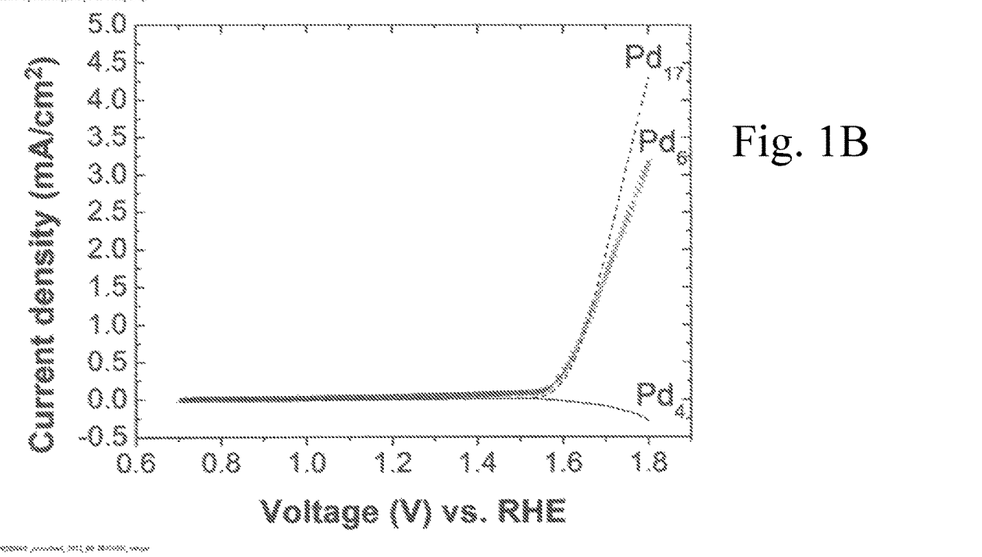

The graphs in FIGS. 1A and 1B depict large increases in anodic current between Pd6 or Pd17 clusters and the UNCD support. In this example, about 10 percent of the total surface area of the electrode was coated with Pd clusters, moreover within this area as low as 0.1 atomic monolayer equivalent of Pd metal ($1.5 \times 10^{14}$ atoms/cm$^2$) was deposited. Generally, between about 1 and 25 percent of the surface area of one side of a support is suitable coverage, and preferably between about 5 and 20 percent coverage. Alternatively, more than one side of a support can be covered with the same type clusters, with clusters comprising different moieties and/or with clusters of different sizes. This mix and matching provides higher efficacy as well as multifunctionally to a cluster support substrates.

This example shows that activity of clusters increases with the number of atoms comprising each of the clusters.

FIG. 1B shows anodic current between the clusters and the support with background corrected (i.e., after subtraction of the current of the blank UNCD support). This figure shows a drop of current between Pd4 and the support, which indicates that a greater fraction of UNCD surface defect (and undesirably active) sites are blocked by the Pd4 clusters. This indicates that the lower atom number clusters are efficient at healing support surface defect, while larger atom clusters also possess added and desired catalytic activity. This means that larger (greater than 4 atoms) possess dual functionality of both healing support surface defects and conferring high catalytic activity.

A feature of the system is using deposition current to calculate the number of deposited clusters on the support electrode. Atom number per cluster represents an upper bound on the number of catalytic reaction sites. The background corrected current, depicted in FIG. 1B, and the known concentration of deposited clusters is used to calculate OER turnover rates. As water oxidation is a four electron transfer process, the per electron rate has been divided by a factor of four. The turnover rates (depicted in FIG. 2) are compared to published studies of Pd metal and Co oxide deposited on Au.

Figure 2:
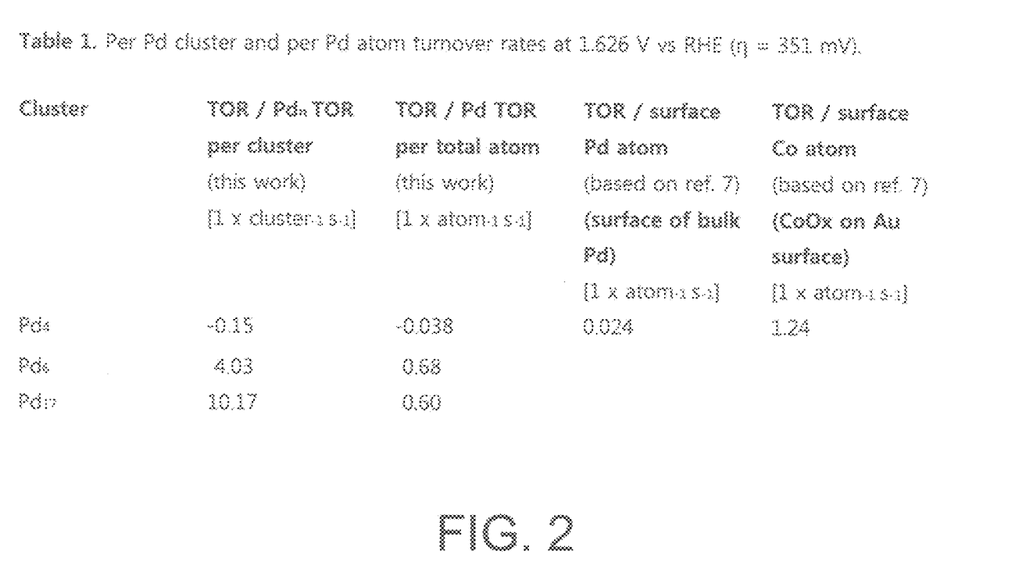
FIG. 2 is a table showing conversion rates, in accordance with features of the present invention.

As shown in FIGS. 1 and 2, Pd4 clusters supported on ultrananocrystalline diamond film electrodes exhibit a small decrease in reactivity compared to UNCD electrodes by themselves. The drop in activity seen with Pd4 deposition, compared to an increase in activity seen with clusters having more than 4 atoms indicates that activity depends on cluster size and numbers, with a preferred number of atoms per cluster ranging from between 3 and 50 for clusters comprising only one catalytic moiety type and from between 4 and 50 for clusters comprising more than one catalytic moiety. The 3-50 atom cluster blocks/units described supra also serve as assembly modules for constructs measured at the nanometer (above 1 nm) or mesoscale level having specific, improved catalytic propensities not seen with the instant (homogenous structure) large particles described herein.

FIG. 2 further shows that individual clusters having more than 4 atoms are more active than Pd metal film or webbing (column 3 of FIG. 2). All of the clusters showed stable performance during repeated voltametric cycles, with currents within an estimated 5 percent uncertainty.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for splitting water comprising:
   a) contacting the water with a catalytic electrode of an electrocatalytic cell, wherein the electrocatalytic cell comprises the catalytic electrode, an alkaline electrolyte with a pH greater than 10, and a reference hydrogen electrode, wherein the two electrodes and electrolyte are all in fluid communication, and wherein the catalytic electrode comprises a wafer coated with (ultra)nanocrystalline diamond so as to define a surface supporting catalyst spots, each spot consisting only of a plurality of palladium clusters, wherein each of the clusters have a size of between 3 and 20 atoms and remain physically isolated from each other, wherein each cluster spot is between 4 and 5 mm in diameter wherein the size of all the plurality of palladium clusters is selected from the group consisting of 4 plus or minus 1, 6 plus or minus 2, and 17 plus or minus 3 atoms of palladium per cluster; and
   b) applying a voltage to the electrodes.

2. The method as recited in claim 1 wherein the (ultra) nanocrystalline diamond overlays a foundation material.

3. The method as recited in claim 1 wherein the wafer comprises silicon.

4. The method of claim 1 wherein the voltage is between approximately −2 V and +2.5V.

5. The method of claim 4 wherein the catalytic electrode is catalytically active at temperatures ranging between approximately 5° C. and 900° C.

6. The method of claim 5 wherein the clusters do not dissolve into smaller clusters or agglomerate into larger clusters.

7. The method of claim 1 wherein wafer coverage by the clusters is about 0.1 atomic ML equivalent of palladium metal.

8. The method of claim 1 wherein each of the clusters size-selected to comprise 4 plus or minus 1 palladium atoms have a turnover rate of about −0.15 cluster$^{-1}$ second$^{-1}$.

9. The method of claim 1 wherein each of the clusters size-selected to comprise 6 plus or minus 2 palladium atoms have a turnover rate of about 4.03 cluster$^{-1}$ second$^{-1}$.

10. The method of claim 1 wherein each of the clusters size-selected to comprise 17 plus or minus 3 palladium atoms have a turnover rate of about 10.17 cluster$^{-1}$ second$^{-1}$.

11. The method of claim 6 wherein the clusters are in fluid communication.

* * * * *